(12) United States Patent
Machida

(10) Patent No.: US 11,762,645 B2
(45) Date of Patent: Sep. 19, 2023

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Hiroaki Machida, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 278 days.

(21) Appl. No.: 17/117,735

(22) Filed: Dec. 10, 2020

(65) Prior Publication Data

US 2021/0318860 A1 Oct. 14, 2021

(30) Foreign Application Priority Data

Apr. 14, 2020 (JP) ................................ 2020-072201

(51) Int. Cl.
*G06F 8/65* (2018.01)
*H04L 41/147* (2022.01)
*H04L 67/00* (2022.01)

(52) U.S. Cl.
CPC .............. *G06F 8/65* (2013.01); *H04L 41/147* (2013.01); *H04L 67/34* (2013.01)

(58) Field of Classification Search
None
See application file for complete search history.

(56) References Cited

U.S. PATENT DOCUMENTS

| 8,677,343 | B2* | 3/2014 | Averbuch | G06F 8/654 |
| | | | | 717/170 |
| 8,881,132 | B2* | 11/2014 | Mopur | G06F 3/0632 |
| | | | | 717/176 |
| 9,313,245 | B2* | 4/2016 | Mandyam | H04L 67/04 |
| 2017/0163559 | A1 | 6/2017 | Oshima | |
| 2023/0008692 | A1* | 1/2023 | Subramaniam | H04L 67/34 |

FOREIGN PATENT DOCUMENTS

JP 2017-102802 A 6/2017

* cited by examiner

*Primary Examiner* — Marina Lee
(74) *Attorney, Agent, or Firm* — Oliff PLC

(57) ABSTRACT

An information processing apparatus includes a processor configured to: receive a scheduled date and time at which control information managed by a management apparatus is downloaded to a device via an external network and an internal network and is updated, the scheduled date and time being determined by the management apparatus; obtain a predicted traffic amount per predetermined time of the internal network at the scheduled date and time; and, in a case where the predicted traffic amount exceeds an acceptable traffic amount per the predetermined time, the acceptable traffic amount being set for the internal network, give a request to change the scheduled date and time to the management apparatus.

20 Claims, 7 Drawing Sheets

FIG. 2

| DEVICE ID | PRODUCT NAME | VERSION | URL | SCHEDULED UPDATE DATE AND TIME | STATUS |
|---|---|---|---|---|---|
| 001 | AAA | 2 | http://·········· | 2020.02.02.18.00 | UPDATED |
| 002 | BBB | 1 | ... | ... | REPORTED |
| 003 | AAA | 2 | ... | — | CANCELLED |
| ... | ... | ... | ... | ... | UNREPORTED |

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-072201 filed Apr. 14, 2020.

BACKGROUND

(i) Technical Field

The present disclosure relates to an information processing apparatus and a non-transitory computer readable medium.

(ii) Related Art

In recent years, a distribution system that distributes content from a server to a device has been proposed (for example, see Japanese Unexamined Patent Application Publication No. 2017-102802).

The distribution system described in Japanese Unexamined Patent Application Publication No. 2017-102802 includes the following: a receiving unit that receives a distribution setting request for content (including an app and firmware) from a management service via a network; a determination unit that determines, in a case where the receiving unit receives a distribution setting request for content, whether a device satisfies a distribution condition (i.e., a device identification (ID) or a version); and a controller that confirms the distribution setting in a case where it is determined that the distribution condition is satisfied, and reports cancellation of the distribution setting to the management service in a case where it is determined that the distribution condition is not satisfied. In the case where the distribution setting is confirmed, in response to an inquiry from the device to the distribution system, a scheduled distribution date and time is sent as a response to the inquiry.

In the case where the device accesses the management server via a network to download firmware, there is a concern about the overuse of the network bandwidth on the device side depending on the file size, which may obstruct the device's original tasks.

SUMMARY

Aspects of non-limiting embodiments of the present disclosure relate to providing an information processing apparatus and a non-transitory computer readable medium for suppressing the overuse of the bandwidth of a network where a device is located at a scheduled update date and time of control information, as compared to the case where no consideration is paid to the acceptable amount.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: receive a scheduled date and time at which control information managed by a management apparatus is downloaded to a device via an external network and an internal network and is updated, the scheduled date and time being determined by the management apparatus; obtain a predicted traffic amount per predetermined time of the internal network at the scheduled date and time; and, in a case where the predicted traffic amount exceeds an acceptable traffic amount per the predetermined time, the acceptable traffic amount being set for the internal network, give a request to change the scheduled date and time to the management apparatus.

BRIEF DESCRIPTION OF THE DRAWINGS

Exemplary embodiments of the present disclosure will be described in detail based on the following figures, wherein:

FIG. 2 is a diagram illustrating an example of an update table;

DETAILED DESCRIPTION

Figure 1:
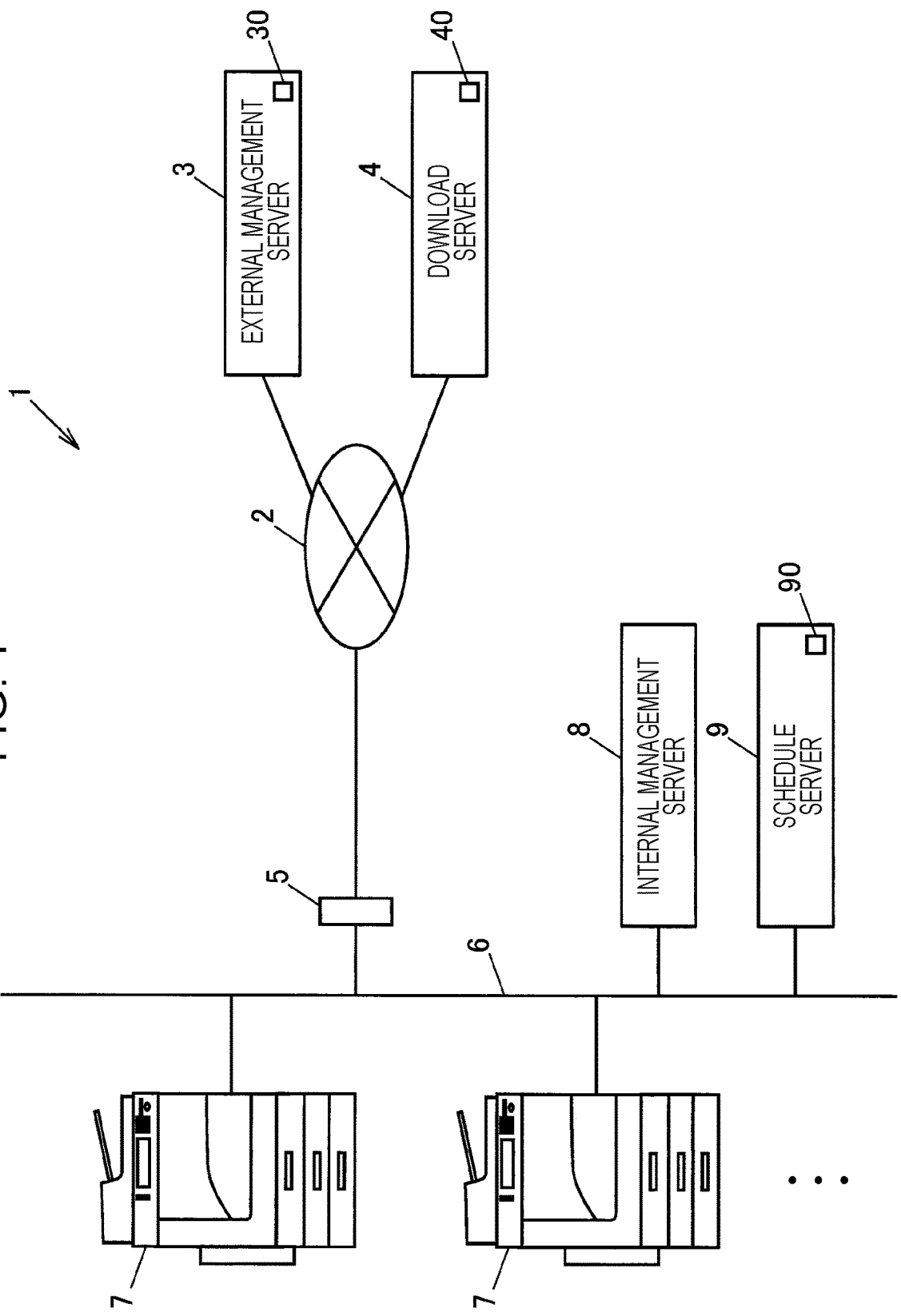
FIG. 1 is a diagram illustrating an example of the configuration of an information processing system according to an exemplary embodiment of the present disclosure.

Hereinafter, exemplary embodiments of the present disclosure will be described with reference to the drawings. Note that elements in the drawings that have substantially the same function are given the same reference numeral, and overlapping descriptions thereof are omitted.

Summary of Exemplary Embodiments

An information processing apparatus according to exemplary embodiments includes a processor configured to: receive a scheduled date and time at which control information managed by a management apparatus is downloaded to a device via an external network and an internal network and is updated, the scheduled date and time being determined by the management apparatus; obtain a predicted traffic amount per predetermined time of the internal network at the scheduled date and time; and, in a case where the predicted traffic amount exceeds an acceptable traffic amount per the predetermined time, the acceptable traffic amount being set for the internal network, give a request to change the scheduled date and time to the management apparatus.

The control information includes firmware, applications, and the like. Firmware is a program for allowing the device's hardware to operate, and is downloaded to the device and is used. The change request includes, for example, a request to cancel or change the scheduled date and time.

First Exemplary Embodiment

FIG. 1 is a diagram illustrating an example of the configuration of an information processing system according to a first exemplary embodiment of the present disclosure. An information processing system 1 includes the following: an external management server 3 and a download server 4, which are provided on an external network 2 such as the Internet; an internal network 6 such as an intranet connected to the external network 2 via a firewall 5; and multiple devices 7, an internal management server 8, and a schedule server 9 connected to the internal network 6. Note that a user terminal may be connected to the internal network 6. The internal management server 8 is an example of an information processing apparatus.

The external management server 3 and the download server 4 are an example of a management apparatus. Note that the external management server 3 and the download server 4 may be connected to each other by an intranet or the like, or all these servers may be constituted of a physically single server.

The external management server 3 holds an update table 30 (see FIG. 2). In response to an inquiry from one of the devices 7, the external management server 3 searches the update table 30 and sends update date and time specifying information 31 (see FIG. 2) as a response to the device 7. The update date and time specifying information 31 includes a scheduled update date and time. The scheduled update date and time is the date and time at which, in order to consecutively perform downloading and updating the version of firmware, a later-described controller 71 of the device 7 sends an inquiry to the external management server 3. The date and time consists of, for example, year, month, day, and time, and may be registered as, for example, 2020.02.02 18.00. Note that the time may consists of hours and minutes, or of hours, minutes, and seconds. The scheduled update date and time is an example of a scheduled date and time.

The download server 4 is a software repository that stores firmware (hereinafter may also be abbreviated as "FW") or the like. In response to access from one of the devices 7, the download server 4 allows the device 7 to download information 40 of a file of firmware (hereinafter may also be referred to as an "FW file").

The firewall 5 is, for example, a gateway, a router, or the like, and aims to prevent unauthorized access or intrusion from the outside. The firewall 5 is set to allow requests (inquiries) from the devices 7 to the external network 2 and responses to the requests to pass, but not allow requests from the external network 2 side to the devices 7 to pass. In addition, the firewall 5 has the function of measuring the traffic amount per unit time of the internal network 6 and storing the traffic amount along with the measurement date and time.

The schedule server 9 holds schedule information 90 including the date and time at which each event takes place. In response to registration of an event in the schedule information 90 as a result of a request from a user terminal or one of the devices 7, the schedule server 9 reports event information to the internal management server 8. The event information includes the date and time at which the event takes place, and the traffic amount used in the event.

FIG. 2 is a diagram illustrating an example of the update table 30 held by the external management server 3. The update table 30 has multiple items such as "device ID", "product name", "version", "URL", "scheduled update date and time", and "status".

In the item "device ID", for example, a machine number for uniquely identifying a corresponding one of the devices 7 is recorded. In the item "product name", the name of firmware is recorded. In the item "version", the version number of the firmware is recorded. The version number is an example of version information. In the item "URL", a uniform resource locator (URL) indicating the location where the firmware is stored is recorded. The URL is an example of storage location information.

In the item "scheduled update date and time", the scheduled update date and time of the firmware is recorded. In the item "status", the update status of the firmware is recorded. For example, in the case where the update date and time specifying information 31 has not been sent as a response to the device 7, the status "unreported" is recorded. In the case where the update date and time specifying information 31 has been reported to the device 7, the status "reported" is recorded. In the case where the update of the firmware is completed, the status "updated" is recorded. In the case where cancellation is received after the update date and time specifying information 31 has been reported to the device 7, the status "cancelled" is recorded. In the case where cancellation is reported, the scheduled update date and time recorded in the update table 30 is deleted. The update date and time specifying information 31 includes the device ID, the product name of firmware, and the version, URL, and scheduled update date and time of the firmware. The scheduled update date and time is an example of a scheduled date and time.

Configuration of Device

Figure 3:
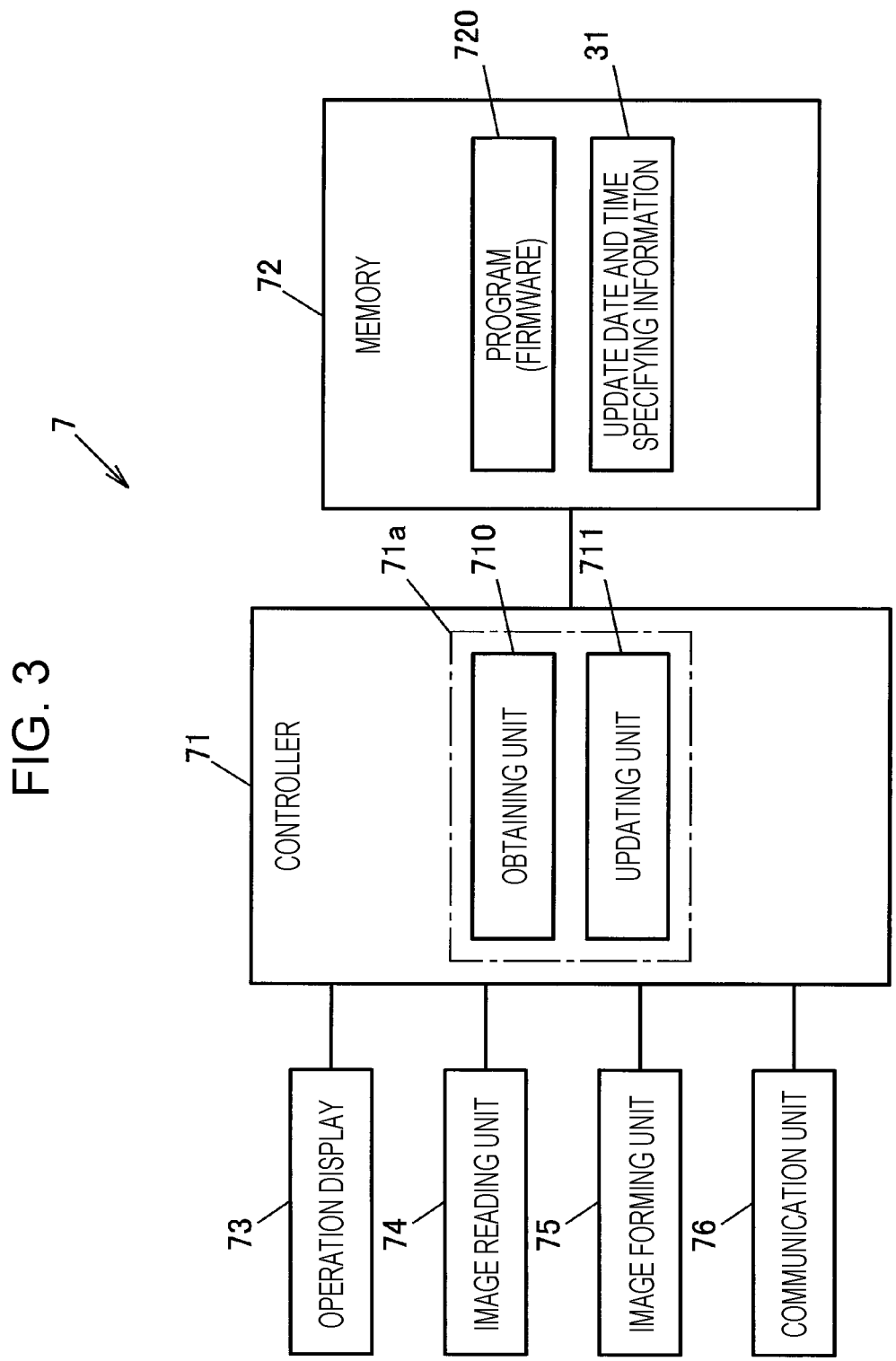
FIG. 3 is a block diagram illustrating an example of a control system of a device.

FIG. 3 is a block diagram illustrating an example of a control system of each of the devices 7. The device 7 is, for example, a multifunctional peripheral that has the scan function, the print function, the copy function, the email function, and the fax send/receive function. The multifunctional peripheral is an example of an image forming apparatus.

The device 7 includes the controller 71, which controls each unit of the device 7. Memory 72, an operation display 73, an image reading unit 74, an image forming unit 75, and a communication unit 76 are connected to the controller 71.

The controller 71 includes a processor 71a such as a central processing unit (CPU), an interface, and the like. The processor 71a functions as an obtaining unit 710, an updating unit 711, and the like by executing a program 720 stored in the memory 72.

The obtaining unit 710 periodically accesses (such as at 18:00 every day) the external management server 3 to inquire whether a scheduled update date and time has been set. If a scheduled update date and time has been set, the obtaining unit 710 obtains, as a response to the inquiry, the update date and time specifying information 31 from the external management server 3, stores the update date and time specifying information 31 in the memory 72, and reports the scheduled update date and time included in the update date and time specifying information 31, along with the device ID, to the internal management server 8.

In addition, when the scheduled update date and time is reached, the obtaining unit 710 accesses the download server 4 on the basis of a URL included in the update date and time specifying information 31, downloads an FW file, and stores the FW file in the memory 72.

The updating unit 711 performs a process of updating the FW file stored in the memory 72, and, when the updating process is completed, sends an update completion report to the external management server 3.

The memory 72 includes read-only memory (ROM), random-access memory (RAM), a hard disk drive, and the like, and stores various types of information including the program 720 such as an FW file, and the update date and time specifying information 31 sent from the external management server 3. The scheduled update date and time included in the update date and time specifying information 31 is determined by the external management server 3.

The operation display 73 is configured to input and display information. The operation display 73 is, for example, a touchscreen display, and has a configuration in which a touchscreen is arranged on a display such as a liquid crystal display.

The image reading unit 74 includes an automatic paper feeder located on a document glass, and a scanner that optically reads a document image from a document placed on the document glass or sent by the automatic paper feeder.

The image forming unit 75 generates a printed matter by forming an image on paper, which is fed from a paper cassette, by using an electrophotographic system or an inkjet system.

The communication unit 76 communicates with an external apparatus such as a user terminal, the external management server 3, the download server 4, the internal management server 8, or the schedule server 9 via a local area network (LAN), the internal network 6, and the external network 2.

Configuration of Internal Management Server

Figure 4:
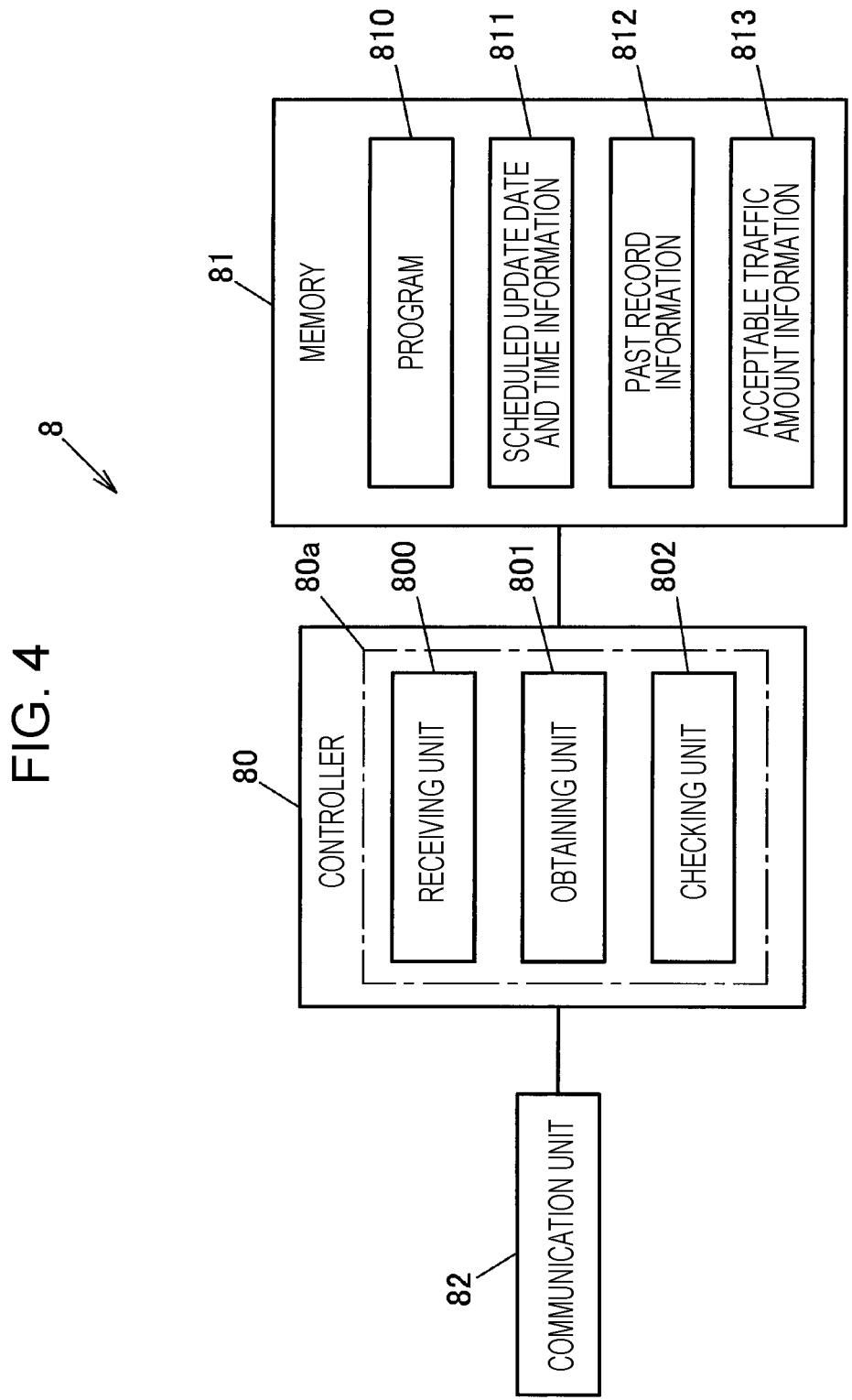
FIG. 4 is a block diagram illustrating an example of a control system of an internal management server.

FIG. 4 is a block diagram illustrating an example of a control system of the internal management server 8. The internal management server 8 includes a controller 80, which controls each unit of the internal management server 8. Memory 81, a communication unit 82, and the like are connected to the controller 80.

The controller 80 includes a processor 80a such as a CPU, an interface, and the like. The processor 80a functions as a receiving unit 800, an obtaining unit 801, a checking unit 802, and the like by executing a program 810 stored in the memory 81. The units 800 to 802 will be described in detail later.

The memory 81 includes ROM, RAM, a hard disk drive, and the like, and stores various types of information including the program 810, scheduled update date and time information 811, past record information 812, and acceptable traffic amount information 813.

The scheduled update date and time information 811 includes a device ID and a scheduled update date and time reported from a device 7 with the device ID.

The past record information 812 is information that relates the average traffic amount obtained by averaging traffic amounts for the past few years, which serve as past records, with date and time. Note that the past record information 812 may be information that relates the maximum traffic amount among traffic amounts for the past few years, which serve as past records, with date and time. In the case where the actually occurring traffic amount depends on day of the week and time of day, the past record information 812 may be information that relates the average traffic amount or the maximum traffic amount with day of the week and time of day, instead of date and time. Date and time, and day of the week and time of day are an example of time information.

The acceptable traffic amount information 813 is set in advance by the administrator or the like and is stored in the memory 81. The acceptable traffic amount information 813 may be defined as follows, for example. Note that the following (a), (b), and (c) are an example of an acceptable traffic amount per predetermined time:

(a) maximum acceptable number of cases or maximum total file size per day;
(b) acceptable number of cases or total file size for each day of the week and time of day; and
(c) maximum acceptable number of cases or maximum total file size on special days (such as the first business day and the last business day of the month, invoice generation day, and so forth).

As an example of this case, because a particular device 7 uses the internal network 6 for the task XX from 9:00 to 12:00 at the beginning of the month, the number of FW update cases for devices 7 other than the particular device 7 on the same day at the same time is up to XX cases. In doing so, the maximum acceptable number of cases is reduced.

Next, the units 800 to 802 of the internal management server 8 will be described.

At the time a scheduled update date and time is reported from one of the devices 7 along with its device ID, the receiving unit 800 stores the scheduled update date and time in relation to the device ID as the scheduled update date and time information 811 in the memory 81.

At the time the scheduled update date and time is reported from the device 7 (hereinafter may also be referred to as a first time point), the obtaining unit 801 obtains, from the past record information 812, a traffic amount corresponding to the scheduled update date and time as a predicted traffic amount. When obtaining the predicted traffic amount, the obtaining unit 801 lets the unit time of the predicted traffic amount correspond to the unit time of the acceptable traffic amount. For example, in the case where the acceptable traffic amount per day is defined, the obtaining unit 801 accordingly obtains the predicted traffic amount per day. In the case where the acceptable traffic amount is defined for each day of the week and time of day, the obtaining unit 801 obtains the predicted traffic amount for the corresponding day of the week and time of day. In addition, the obtaining unit 801 obtains the acceptable traffic amount from the acceptable traffic amount information 813. Note that obtaining includes the case where the acceptable traffic amount is obtained by calculation based on one or more obtained values.

The checking unit 802 checks the validity of the scheduled update date and time included in the update date and time specifying information 31, which is whether there is no problem in the scheduled update date and time. That is, the checking unit 802 determines whether the following relational expression (1) is satisfied:

$$Vp1 \leq Va \qquad (1)$$

where Vp1 is the predicted traffic amount per predetermined time obtained at the first time point, and Va is the acceptable traffic amount per predetermined time.

The checking unit 802 reports the result of checking the above (hereinafter may also be referred to as the checking result) to the device 7. The checking result may be OK indicating that the relational expression (1) is satisfied or NG indicating that the relational expression (1) is not satisfied.

In the case where the checking result is NG, the checking unit 802 reports cancellation of the scheduled update date and time to the external management server 3. Note that the external management server 3 may be requested to change the scheduled update date and time. If a low traffic season is known, a preferred update date and time may be reported. Cancellation is an example of a change request.

Operation of Information Processing System

Figure 5:
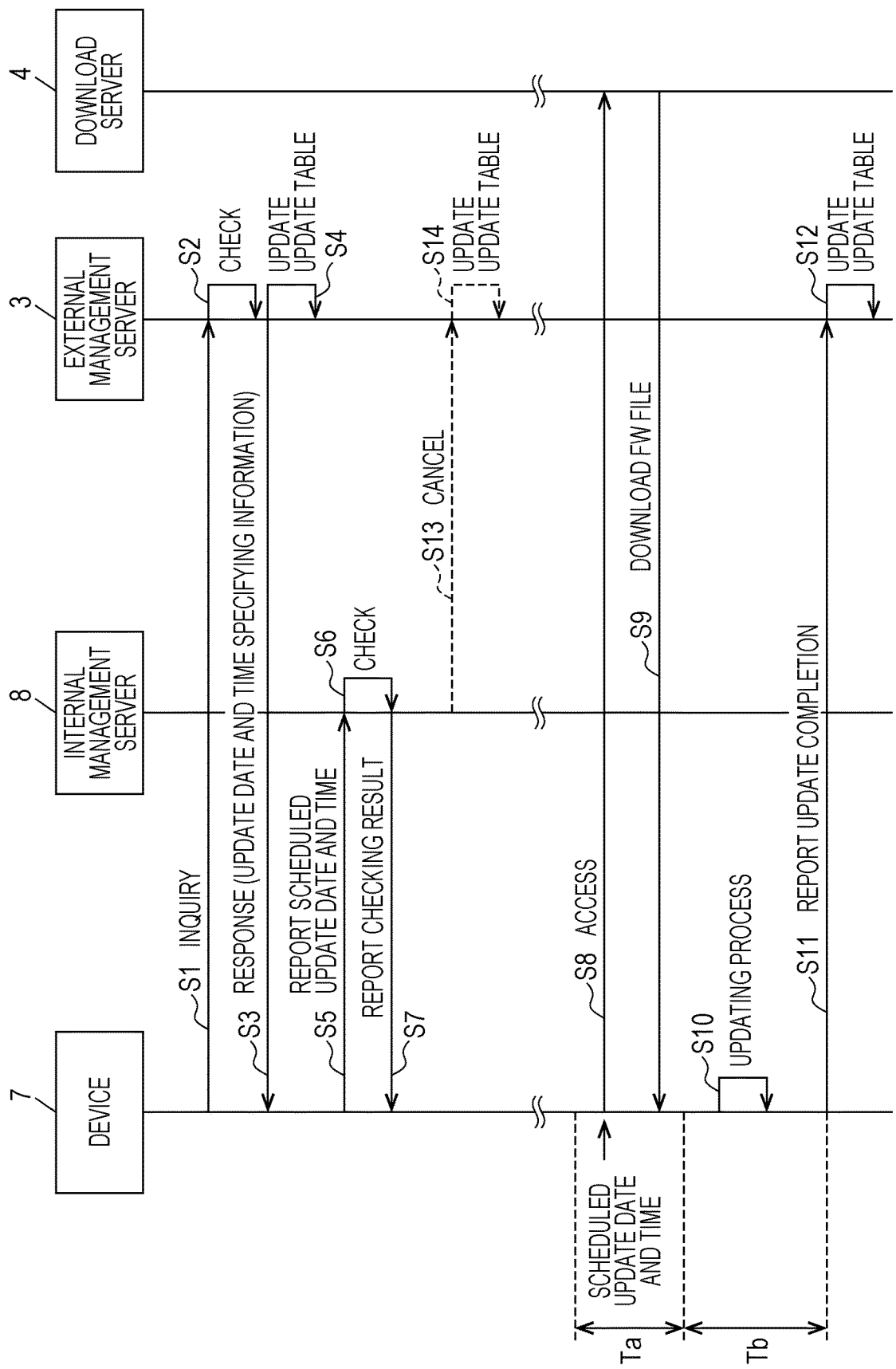
FIG. 5 is a sequence diagram illustrating an example of the operation of the information processing system.

An example of the operation of the information processing system 1 in the case of checking the validity of a scheduled update date and time at the first time point at which the scheduled update date and time is reported will be described by referring to the sequence diagram illustrated in FIG. 5. Note that in FIG. 5 and in FIGS. 6 and 7 described later, Ta indicates a download period and Tb indicates an update period.

The obtaining unit 710 of one of the devices 7 accesses the external management server 3 and inquires whether a scheduled update date and time has been set (S1). The inquiry includes the device ID, the product name of firmware, and the version of the firmware.

The external management server 3 searches the update table 30 to check whether a scheduled update date and time has been set to the device 7 (S2). In the case where a scheduled update date and time has been set (Yes in S2), the external management server 3 sends the update date and time specifying information 31 including the scheduled update date and time to the device 7.

The obtaining unit 710 obtains, as a response to the inquiry, the update date and time specifying information 31 from the external management server 3 (S3). The external management server 3 records "reported" in the corresponding "status" in the update table 30, and updates the update table 30 (S4).

The obtaining unit 710 reports the scheduled update date and time included in the update date and time specifying information 31, along with the device ID, to the internal management server 8 (S5).

The obtaining unit 801 of the internal management server 8 stores the scheduled update date and time and the device ID, reported from the device 7, as the scheduled update date and time information 811 in the memory 81.

The obtaining unit 801 obtains a predicted traffic amount Vp1 from the past record information 812, and obtains an acceptable traffic amount Va from the acceptable traffic amount information 813.

The checking unit 802 checks whether the predicted traffic amount Vp1≤the acceptable traffic amount Va in the above-mentioned relational expression (1) is satisfied (S6).

The checking unit 802 reports the checking result in step S6 to the device 7 (S7).

In the case where the checking result is OK, when the scheduled update date and time is reached, the obtaining unit 710 of the device 7 accesses the download server 4 on the basis of a URL included in the update date and time specifying information 31 (S8), downloads an FW file, and stores the FW file in the memory 72 (S9).

The updating unit 711 performs a process of updating the FW file stored in the memory 72 (S10), and, when the updating process is completed, sends an update completion report to the external management server 3 (S11).

The external management server 3 records "updated" in the corresponding "status" in the update table 30, and updates the update table 30 (S12).

In the case where the checking result in step S6 is NG, the checking unit 802 of the internal management server 8 reports cancellation of the scheduled update date and time to the external management server 3 (S13).

When cancellation of the scheduled update date and time is reported (S13), the external management server 3 records "cancelled" in the corresponding "status" in the update table 30, and deletes the scheduled update date and time in the "scheduled update date and time" (S14).

Second Exemplary Embodiment

Figure 6:
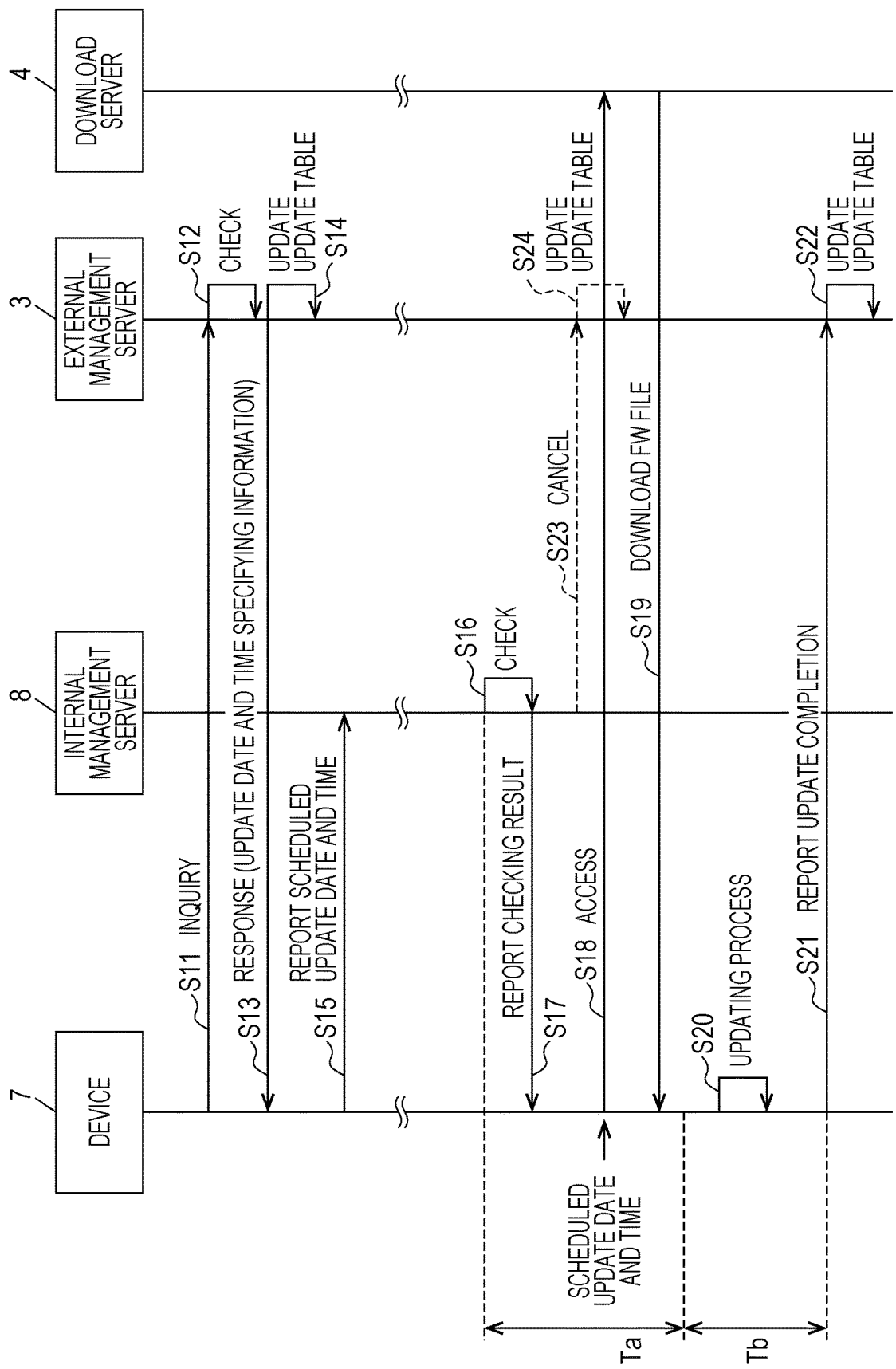
FIG. 6 is a sequence diagram illustrating an example of the operation of the information processing system.

FIG. 6 is a sequence diagram illustrating an example of the operation of an information processing system according to a second exemplary embodiment of the present disclosure. In the first exemplary embodiment, the checking unit 802 of the internal management server 8 checks the validity of a scheduled update date and time at the time the scheduled update date and time is reported. The checking unit 802 in the present exemplary embodiment checks the validity of a scheduled update date and time when the scheduled update date and time is reached. Since the other portions are configured in the same manner as those in the first exemplary embodiment, points that are different from the first exemplary embodiment will be mainly described below.

When the scheduled update date and time is reached, such as immediately before (for example, three minutes before) the scheduled update date and time is reached (hereinafter may also be referred to as a second time point), the obtaining unit 801 obtains a traffic amount indicating the current congestion of the internal network 6 from the firewall 5. Note that "when the scheduled update date and time is reached" may be a time point at which the scheduled update date and time is reached. In addition, the obtaining unit 801 may obtain the traffic amount up to now on the same day as the scheduled update date and time from the past record information 812 (including when updated manually).

The checking unit 802 checks the validity of the scheduled update date and time included in the update date and time specifying information 31, which is whether there is no problem in the scheduled update date and time. That is, the checking unit 802 determines whether the following relational expression (2) is satisfied:

$$Vp2 \leq Va \quad (2)$$

where Vp2 is the predicted traffic amount per predetermined time obtained at the second time point, and Va is the acceptable traffic amount per predetermined time.

The checking unit 802 reports the result of checking the above (hereinafter may also be referred to as the checking result) to the device 7. The checking result may be OK indicating that the relational expression (2) is satisfied or NG indicating that the relational expression (2) is not satisfied. Since the operation in the case where the checking result is NG is the same as that in the first exemplary embodiment, a description thereof is omitted.

Operation in Second Exemplary Embodiment

An example of the operation of the information processing system 1 in the case of checking the validity of a scheduled update date and time at the second time point at which the scheduled update date and time is reached will be described by referring to the sequence diagram illustrated in FIG. 6.

The obtaining unit 710 of one of the devices 7 accesses the external management server 3 and inquires whether a scheduled update date and time has been set (S11).

The external management server 3 searches the update table 30 to check whether a scheduled update date and time has been set to the device 7 (S12). In the case where a scheduled update date and time has been set (Yes in S12), the external management server 3 sends the update date and time specifying information 31 including the scheduled update date and time to the device 7.

The obtaining unit 710 obtains, as a response to the inquiry, the update date and time specifying information 31 from the external management server 3 (S13). The external management server 3 records "reported" in the corresponding "status" in the update table 30, and updates the update table 30 (S14).

The obtaining unit 710 reports the scheduled update date and time included in the update date and time specifying information 31, along with the device ID, to the internal management server 8 (S15).

The obtaining unit 801 of the internal management server 8 stores the scheduled update date and time and the device ID, reported from the device 7, as the scheduled update date and time information 811 in the memory 81.

Immediately before the scheduled update date and time is reached, the obtaining unit 801 obtains the current traffic amount as a predicted traffic amount Vp2 per predetermined time from the firewall 5, and obtains an acceptable traffic amount Va from the acceptable traffic amount information 813.

The checking unit 802 checks whether the predicted traffic amount Vp2≤the acceptable traffic amount Va in the above-mentioned relational expression (2) is satisfied (S16).

The checking unit 802 reports the checking result in step S16 to the device 7 (S17).

In the case where the checking result is OK, when the scheduled update date and time is reached, the obtaining unit 710 of the device 7 accesses the download server 4 on the basis of a URL included in the update date and time specifying information 31 (S18), downloads an FW file, and stores the FW file in the memory 72 (S19).

The updating unit 711 performs a process of updating the FW file stored in the memory 72 (S20), and, when the updating process is completed, sends an update completion report to the external management server 3 (S21).

The external management server 3 records "updated" in the corresponding "status" in the update table 30, and updates the update table 30 (S22).

In the case where the checking result in step S16 is NG, the checking unit 802 of the internal management server 8 reports cancellation of the scheduled update date and time to the external management server 3 (S23).

When cancellation of the scheduled update date and time is reported (S23), the external management server 3 records "cancelled" in the corresponding "status" in the update table 30, and deletes the scheduled update date and time in the "scheduled update date and time" (S24).

Third Exemplary Embodiment

Figure 7:
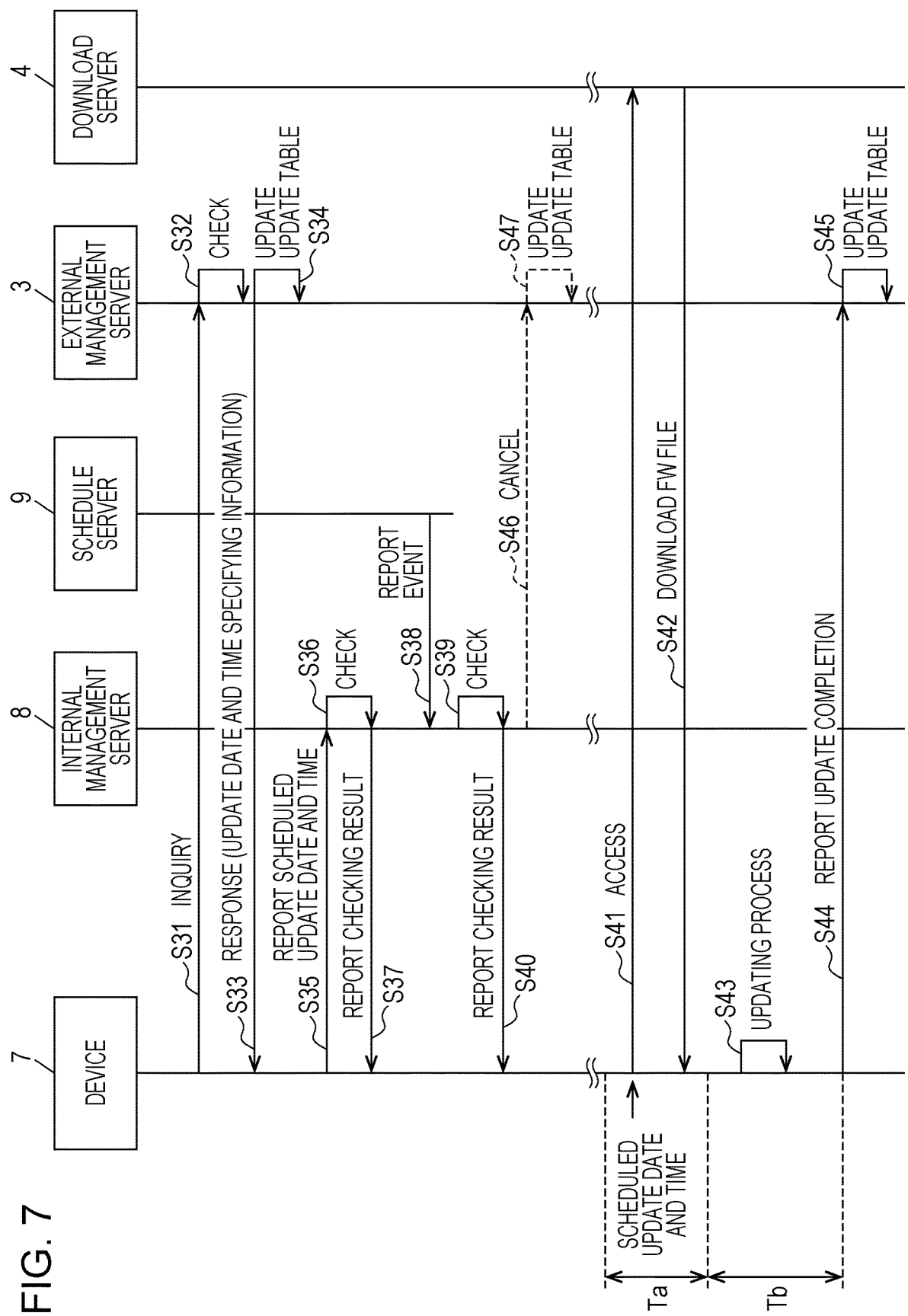
FIG. 7 is a sequence diagram illustrating an example of the operation of the information processing system.

FIG. 7 is a sequence diagram illustrating an example of the operation of an information processing system according to a third exemplary embodiment of the present disclosure. In the first exemplary embodiment, the checking unit 802 of the internal management server 8 checks the validity of a scheduled update date and time at the time the scheduled update date and time is reported. The checking unit 802 in the present exemplary embodiment further checks the validity of the scheduled update date and time between the time point at which the scheduled update date and time is reported and the scheduled update date and time. Since the other portions are configured in the same manner as those in the first exemplary embodiment, points that are different from the first exemplary embodiment will be mainly described below.

At the first time point at which the scheduled update date and time is received, the obtaining unit 801 obtains a traffic amount corresponding to the scheduled update date and time as a predicted traffic amount from the past record information 812. In addition, in the case where an event overlaps the scheduled update date and time on the basis of event information sent from the schedule server 9, the obtaining unit 801 obtains, from the event information, a traffic amount used in the event as an additional predicted traffic amount.

The checking unit 802 determines whether the above-mentioned relational expression (1) is satisfied at the first time point at which the scheduled update date and time is received, and, in the case where the relational expression (1) is satisfied, the checking unit 802 determines whether the following relational expression (3) is satisfied:

$$(Vp=Vp1+Vp3) \leq Va \quad (3)$$

where Vp1 is the predicted traffic amount per predetermined time, which is predicted at the time the scheduled update date and time is reported; Vp3 is the additional predicted traffic amount per predetermined time, which occurs at the event; and Va is the acceptable traffic amount per predetermined time.

The checking unit 802 reports the checking result to the device 7. The checking result may be OK indicating that the relational expression (3) is satisfied or NG indicating that the relational expression (3) is not satisfied. Since the checking unit 802 in the case where the checking result is NG is the same as that in the first exemplary embodiment, a description thereof is omitted.

Operation in Third Exemplary Embodiment

An example of the operation of the information processing system 1 in the case of checking the validity of a scheduled update date and time at a third time point between the time point at which the scheduled update date and time is reported and the scheduled update date and time will be described by referring to the sequence diagram illustrated in FIG. 7.

The obtaining unit 710 of one of the devices 7 accesses the external management server 3 and inquires whether a scheduled update date and time has been set (S31).

The external management server 3 searches the update table 30 to check whether a scheduled update date and time has been set to the device 7 (S32). In the case where a scheduled update date and time has been set (Yes in S32), the external management server 3 sends the update date and time specifying information 31 including the scheduled update date and time to the device 7.

The obtaining unit 710 obtains, as a response to the inquiry, the update date and time specifying information 31 from the external management server 3 (S33). The external management server 3 records "reported" in the corresponding "status" in the update table 30, and updates the update table 30 (S34).

The obtaining unit 710 reports the scheduled update date and time included in the update date and time specifying information 31, along with the device ID, to the internal management server 8 (S35).

The obtaining unit 801 of the internal management server 8 stores the scheduled update date and time and the device ID, reported from the device 7, as the scheduled update date and time information 811 in the memory 81.

The obtaining unit 801 obtains a predicted traffic amount Vp1 from the past record information 812, and obtains an acceptable traffic amount Va from the acceptable traffic amount information 813.

The checking unit 802 checks whether the predicted traffic amount Vp1≤the acceptable traffic amount Va in the above-mentioned relational expression (1) is satisfied (S36).

The checking unit 802 reports the checking result in step S36 to the device 7 (S37).

When event information is reported from the schedule server 9 to the internal management server 8 (S38), if an event overlaps the scheduled update date and time on the basis of the event information sent from the schedule server 9, the obtaining unit 801 obtains, from the event information, a traffic amount used in the event as an additional predicted traffic amount Vp3. The obtaining unit 801 obtains an acceptable traffic amount Va from the acceptable traffic amount information 813.

The checking unit 802 checks whether the predicted traffic amount (Vp=Vp1+Vp3)≤the acceptable traffic amount Va in the above-mentioned relational expression (3) is satisfied (S39).

The checking unit 802 reports the checking result in step S39 to the device 7 (S40).

In the case where the checking result is OK, when the scheduled update date and time is reached, the obtaining unit 710 of the device 7 accesses the download server 4 on the basis of a URL included in the update date and time specifying information 31 (S41), downloads an FW file, and stores the FW file in the memory 72 (S42).

The updating unit 711 performs a process of updating the FW file stored in the memory 72 (S43), and, when the updating process is completed, sends an update completion report to the external management server 3 (S44).

The external management server 3 records "updated" in the corresponding "status" in the update table 30, and updates the update table 30 (S45).

In the case where the checking result in step S39 is NG, the checking unit 802 of the internal management server 8 reports cancellation to the external management server 3 (S46).

When cancellation is reported (S46), the external management server 3 records "cancelled" in the corresponding "status" in the update table 30, and deletes the scheduled update date and time in the "scheduled update date and time" (S47).

First Modification

After the obtaining unit 801 obtains the acceptable traffic amount, the processor 80*a* may receive a change of the acceptable traffic amount. For example, in the case where a sudden event is reported from the schedule server 9, the acceptable traffic amount may be increased.

Second Modification

In the case where the validity of the scheduled update date and time is checked at the first time point or the third time point and there is no problem, the validity of the scheduled update date and time may be checked at the second time point.

Although the exemplary embodiments of the present disclosure have been described above, the exemplary embodiments of the present disclosure are not limited to the above-described exemplary embodiments, and various modifications may be implemented.

Some (one or more) or all the units of the processor 80*a* may be set up by a hardware circuit such as a field-programmable gate array (FPGA) or an application-specific integrated circuit (ASIC).

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

In addition, one or some of the elements in the above-described exemplary embodiments may be omitted or changed. In addition, one or more steps may be added, deleted, changed, or replaced in the flow of the exemplary embodiments. In addition, a program used in the above-described exemplary embodiments may be recorded on a computer-readable recoding medium such as a compact-disc read-only memory (CD-ROM) and provided, or may be stored in an external server such as a cloud server and used via a network.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
   a processor configured to
   receive a scheduled date and time at which control information managed by a management apparatus is downloaded to a device via an external network and an internal network and is updated, the scheduled date and time being determined by the management apparatus,
   obtain a predicted traffic amount per predetermined time of the internal network at the scheduled date and time, and
   in a case where the predicted traffic amount exceeds an acceptable traffic amount per the predetermined time, the acceptable traffic amount being set for the internal network, give a request to change the scheduled date and time to the management apparatus.

2. The information processing apparatus according to claim 1, wherein the processor is configured to obtain the predicted traffic amount at any time point prior to the scheduled date and time.

3. The information processing apparatus according to claim 2, wherein the processor is configured to obtain the predicted traffic amount at a first time point at which the scheduled date and time is received.

4. The information processing apparatus according to claim 2, wherein the processor is configured to obtain the predicted traffic amount at a second time point at which the scheduled date and time is reached.

5. The information processing apparatus according to claim 3, wherein, in a case where the predicted traffic amount is less than or equal to the acceptable traffic amount at the first time point, and it turns out, at a third time point between the first time point and a second time point at which the scheduled date and time is reached, that the predicted traffic amount increases at the scheduled date and time, if the predicted traffic amount after the increase exceeds the acceptable traffic amount, the processor is configured to give a request to change the scheduled date and time to the management apparatus.

6. The information processing apparatus according to claim 3, wherein, in a case where the predicted traffic amount is less than or equal to the acceptable traffic amount at the first time point, and, in a case where the predicted traffic amount at the scheduled date and time is obtained again at a second time point at which the scheduled date and time is reached and the again-obtained predicted traffic amount exceeds the acceptable traffic amount, the processor is configured to give a request to change the scheduled date and time to the management apparatus.

7. The information processing apparatus according to claim 1, wherein the predicted traffic amount is obtained from past record information that relates a traffic amount serving as a past record with time information.

8. The information processing apparatus according to claim 2, wherein the predicted traffic amount is obtained from past record information that relates a traffic amount serving as a past record with time information.

9. The information processing apparatus according to claim 3, wherein the predicted traffic amount is obtained from past record information that relates a traffic amount serving as a past record with time information.

10. The information processing apparatus according to claim 4, wherein the predicted traffic amount is obtained from past record information that relates a traffic amount serving as a past record with time information.

11. The information processing apparatus according to claim 5, wherein the predicted traffic amount is obtained from past record information that relates a traffic amount serving as a past record with time information.

12. The information processing apparatus according to claim 6, wherein the predicted traffic amount is obtained from past record information that relates a traffic amount serving as a past record with time information.

13. The information processing apparatus according to claim 7, wherein the predicted traffic amount is obtained further from schedule information including a date and time at which an event takes place, and a traffic amount used in the event.

14. The information processing apparatus according to claim 8, wherein the predicted traffic amount is obtained further from schedule information including a date and time at which an event takes place, and a traffic amount used in the event.

15. The information processing apparatus according to claim 9, wherein the predicted traffic amount is obtained further from schedule information including a date and time at which an event takes place, and a traffic amount used in the event.

16. The information processing apparatus according to claim 10, wherein the predicted traffic amount is obtained further from schedule information including a date and time at which an event takes place, and a traffic amount used in the event.

17. The information processing apparatus according to claim 11, wherein the predicted traffic amount is obtained further from schedule information including a date and time at which an event takes place, and a traffic amount used in the event.

18. The information processing apparatus according to claim 4, wherein the predicted traffic amount is obtained at the second time point from traffic circumstances of the internal network.

19. The information processing apparatus according to claim 1, wherein the processor is configured to receive a change of the acceptable traffic amount after obtaining the acceptable traffic amount.

20. A non-transitory computer-readable storage medium storing a program causing a computer to execute a process, the process comprising:
- receiving a scheduled date and time at which control information managed by a management apparatus is downloaded to a device via an external network and an internal network and is updated, the scheduled date and time being determined by the management apparatus;
- obtaining a predicted traffic amount per predetermined time of the internal network at the scheduled date and time; and
- in a case where the predicted traffic amount exceeds an acceptable traffic amount per the predetermined time, the acceptable traffic amount being set for the internal network, giving a request to change the scheduled date and time to the management apparatus.

* * * * *